United States Patent [19]

Kress

[11] Patent Number: 5,060,733
[45] Date of Patent: Oct. 29, 1991

[54] POWER-DRIVEN SCREWING TOOL

[75] Inventor: Willy Kress, Bisingen, Fed. Rep. of Germany

[73] Assignee: Kress-elektrik GmbH & Co., Elektromotorenfabrik, Bisingen, Fed. Rep. of Germany

[21] Appl. No.: 478,256

[22] Filed: Feb. 9, 1990

[30] Foreign Application Priority Data

Feb. 10, 1989 [DE] Fed. Rep. of Germany ... 8901499[U]

[51] Int. Cl.$^5$ ........................................... B25B 23/157
[52] U.S. Cl. ...................................... 173/12; 173/13; 81/473
[58] Field of Search ............................ 173/12, 163, 13; 81/473, 474

[56] References Cited

U.S. PATENT DOCUMENTS 4,243,129  1/1981  Schoeps ........................... 192/56 C
4,278,427  7/1981  Lingenhöle et al. ................. 433/100
4,546,833  10/1985  Berecz et al. ......................... 173/12
4,655,103  4/1987  Schreiber et al. ..................... 81/474

Primary Examiner—Frank T. Yost
Assistant Examiner—John M. Husar
Attorney, Agent, or Firm—Darby & Darby

[57] ABSTRACT

A power-driven screwing tool comprising an electric drive motor, an adjustable depth stop, a drive shaft receiving the screwing tool and adapted for being displaced relative to the depth stop. Between the drive motor and the drive shaft, a first clutch (jaw clutch) transmits the driving torque by form-locking engagement, while a second clutch responds to the predetermined screwing depth and acts to release the form-locking engagement of the first clutch by comprising a transverse pin being engaged or disengaged by a guide pocket whose bottom surface extends at a certain inclination relative to the longitudinal axis of the drive shaft.

5 Claims, 1 Drawing Sheet

POWER-DRIVEN SCREWING TOOL

BACKGROUND OF THE INVENTION

The present invention relates to a power-driven screwing tool.

A known screwing tool of this type (DE-PS 36 37 852) comprises a delayed-action clutch which acts to disengage a jaw clutch when the ceiling torque is exceeded, due to the pre-adjusted screwing depth, i.e. which then insures that a sufficient clearance exists between the end faces of the oppositely arranged jaws of the two clutch elements forming the jaw clutch. The reason why such separation must be ensured lies in the fact that in the case of a screwing tool with depth stop the drive shaft of the screw driver moves in axially forward direction relative to the tool, which is fixed to the depth stop, whereby it causes the jaw clutch to get disengaged, if only gradually, by entraining the one clutch element of the jaw clutch, while there remains a tendency, at the point of transition for disengagement, to maintain the engagement when the screwing tool is further loaded, which causes the jaws of the jaw clutch to rip past each other or to hit against each other causing considerable noise. This is not only disturbing, but may also lead to considerable wear in the area of the jaw clutch which is responsible for separating the drive shaft from the electric drive motor. As a consequence of these phenomena, vibrations may occur and heat may develop.

In order to remedy this problem, an arrangement has been proposed (DE-PS 35 10 605) in which a spring-loaded intermediate disc likewise provided with jaws is arranged between the two halves of the jaw clutch of a screwing tool, which intermediate disc is mounted to rotate freely and to move in axial direction along the drive shaft of the tool. The connection between the end faces of this intermediate disc and the adjoining clutch elements, which exhibit corresponding complementary shapes, is ensured by cams on the one side and by claws on the other side, the claws being provided on one side with inclined surfaces for axial lift-off, so that the intermediate disc is also permitted to move in the axial direction. This then enables these clutch elements to be separated fully, supported by the action of a spring, at the very moment when the ceiling torque is reached or, to say it in other words, at the very moment when the drive shaft, which can be displaced in the axial direction, has been moved outwardly to a point where the cams in one clutch area are no longer capable of transmitting a torque because they are coming out of engagement, because on the other side of the intermediate disc the claws come to slide off the inclined surfaces at the same moment, whereby the axial clearance in the cam transmission area of the clutch is enlarged additionally.

However, it is a problem encountered in connection with this solution that the additional arrangement of the intermediate disc requires additional space and makes the structure as a whole more complex. In particular, this intermediate disc, which is freely movable in both the axial and radial directions, constitutes an element subject to wear which, therefore, may increase the susceptibility to trouble of the whole unit.

The power-driven screwing tool described by the beforementioned publication (DE-PS 36 37 852) seeks to overcome this problem by doing without any such intermediate clutch element, i.e. the additional intermediate disc, and by designing the transition area between the clutch element of the jaw clutch on the drive-shaft end and the drive shaft in a particular way so as to form a delayed-action clutch. This delayed-action clutch allows a relative rotary movement between the drive shaft and this clutch element only over a small angle. It is implemented by an arrangement in which a transverse pin fixed against rotation on the drive shaft engages closed bores or inclined transverse guides arranged on the clutch element. These inclined stop faces ensure at the same time that during movement of the transverse pin along its guides, an axial relative displacement occurs between the clutch element and the drive shaft which, upon disengagement of the clutch of the unit when the desired screwing depth has been reached, ensures in the conventional manner that the disengagement of the jaw clutch occurring when the transmitted torque starts to disappear—when the ceiling torque is reached—is completed by an enlargement of the existing clearance. However, it is a problem of this known solution that on the one hand guides are to be worked into the clutch element of the jaw clutch on the drive-shaft end, which guides have the form of closed cavities and require in addition the corresponding inclined surfaces, which can be realized only with great difficulty, and that in addition the assembly of the components is also rendered much more difficult.

Now, it is the object of the present invention to introduce considerable simplifications in the area of the delayed-action clutch of such a power-driven screwing tool, while maintaining on the other hand the rapid disconnecting processes provoked by the inclined surfaces at the transition point, when the ceiling torque is reached.

ADVANTAGES OF THE INVENTION

The invention achieves this object with the aid of the characterizing features specified in the main claim and provides the advantage that the entraining pockets or guides for the delayed-action clutch are axially open so that during production they can be worked (cut) into the corresponding elements without considerable problems, for example by milling or planing, and that in addition the assembly operations also do not present any problems as the individual components only have to be put together, without the need to effect complicated operations in the partly assembled condition, such as the fitting and fixing of transverse elements.

It is regarded as a particular advantage that, thanks to the present invention, the engaging and disengaging clutch, which is always required for all such power-driven screwing tools and which is normally designed as a jaw clutch, can be left substantially unchanged in all respects, with the exception only that outwardly open and freely accessible entraining means are provided in the area of the transmission between the clutch element of the jaw clutch on the drive-shaft side and the drive shaft as such, which entraining means is provided with an inclined surface providing the possibility of a relative axial movement between the drive shaft and the said clutch element. This ensures that when the torque ceases to be exercised at the moment when the predetermined screwing depth has been reached, a spring-supported relative movement can occur between the drive shaft and the adjacent clutch element of the jaw clutch in a direction which leads to a reduction of the spacing between the shaft and the clutch element and/or which causes the clutch element to drop back into contact with a stop in the shaft area. This causes the opening action in the clutch area of the clutch to be supported correspondingly so that when the teeth or jaws of the clutch start to become disengaged at the moment, when it becomes first impossible for the clutch to transmit a torque, the disengaging movement will be completed instantaneously by the above-mentioned relative movement between the drive shaft and the associated clutch element so that the jaw clutch will be separated irrevocably, without any ripping or rattling.

The features specified in the subclaims permit advantageous improvements and developments of the invention. A particularly favorable arrangement is obtained when a transverse driving pin is arranged on the driving shaft, in the area of the delayed-action clutch implemented in this manner, but outside the area of the jaw clutch, so that this transverse driver pin comes to abut only against the outer end faces, on the drive-shaft side, of the adjacent clutch element of the jaw clutch, and to engage correspondingly shaped, i.e. axially open pockets adapted for receiving the pin. The bottom of the pocket is then inclined so that the pin comes to rest against the bottom of the pocket in which it is guided and received, at a level depending at each moment on the relative rotary position between the drive shaft and the clutch element. This ensures that as long as a torque is transmitted during the screwing operation, this clutch element is pushed in a direction away from the drive shaft so that firm form-locking engagement is maintained in the area of the jaw clutch. This situation changes at the moment when the ceiling torque is reached and the pin is permitted to travel inwardly within its pocket, whereby the distance between the said clutch element and the drive shaft is reduced while the clearance in the jaw area is increased, in a supporting manner, as described before.

BRIEF DESCRIPTION OF THE DRAWING

Certain embodiments of the invention will be described hereafter in more detail with reference to the drawing in which:

FIG. 2 shows a side view, partly cut, of a transition area of the clutch of a power-driven screwing tool identical to that illustrated in FIG. 1; while

DESCRIPTION OF THE EMBODIMENTS

It is the basic idea of the present invention that the area of the delayed-action clutch between the drive shaft and the adjacent clutch element of the jaw clutch, where surfaces adjoin each other, should be given an open design in such a manner that one element or the end face of one element is provided with guide surfaces or receiving pockets which are axially open in the direction of the other part and which are engaged by a driver element provided on the other part. The dimensions and surfaces of the receiving pocket are designed in such a manner that the driver element of the other part performs a limited rotary movement and, consequently and simultaneously, an axial sliding movement provoked by this rotary movement.

Figure 1:
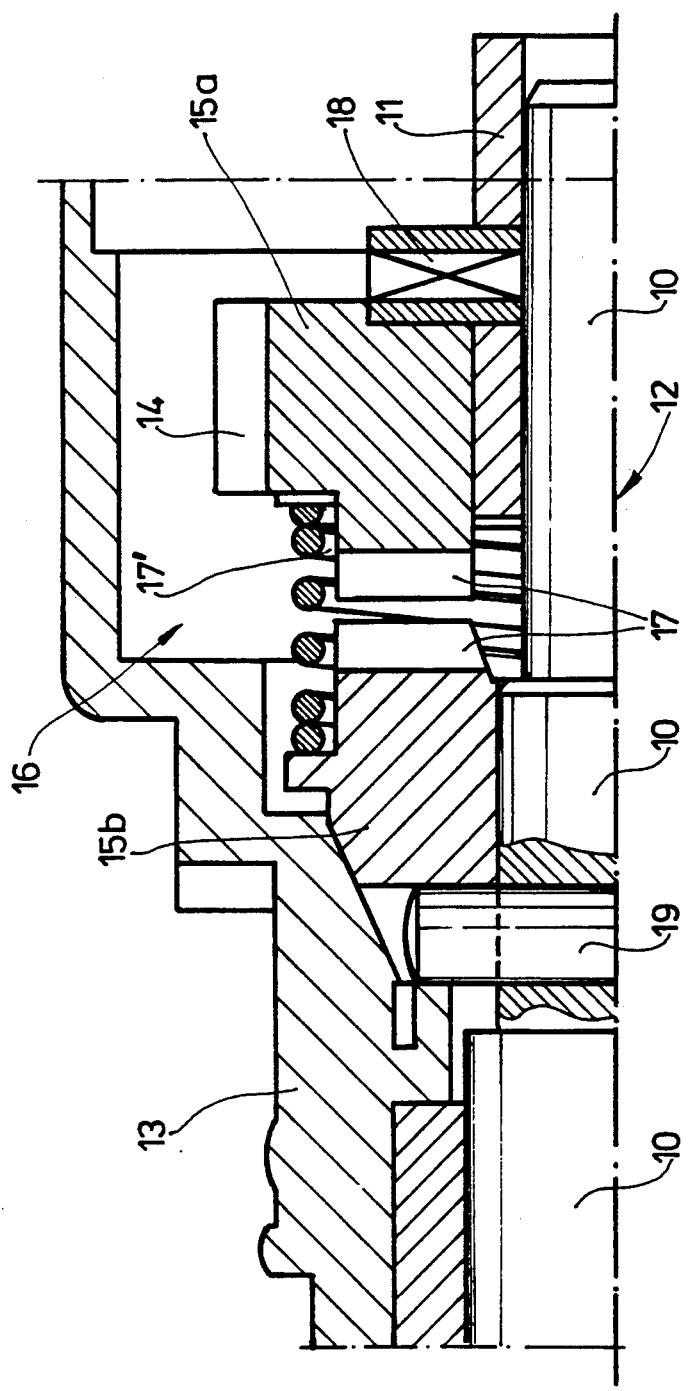
FIG. 1 shows a longitudinal section, in greatly enlarged scale, of a detail of the clutch area of a power-driven screwing tool—for complete understanding and better illustration of the areas which are not essential for the invention, the reader is referred to the before-mentioned publications DE-PS 36 37 825 and DE-PS 35 10 605.

The driver element engaging the guide pockets need not be fixed on the other element. Instead, it may only be retained in the latter against rotation. In FIG. 1, a stepped drive shaft is indicated by reference numeral 10, and a bearing seating the right end of the shaft —as viewed in the drawing—and being fixed to the housing is designated by reference numeral 11. The drive unit 12 of the power—driven screwing tool illustrated in FIG. 1 is only part of the whole system and is followed to the right—as viewed in the drawing—by the drive motor, the handle, and the like, while at the left—as viewed in the drawing—the end portion of the drive shaft 10 extending beyond the housing indicated by 13 in the drawing carries a screwing tool not shown in the drawing.

A pinion of the drive motor—both of them are not shown in the drawing—engages a toothed rim 14 provided on a first clutch element 15a of a jaw clutch 16, the jaws of which are designated by reference numeral 17. The second clutch element of the jaw clutch 16 is designated by reference numeral 15b and held at a clearance relative to the clutch element 15a—which is axially fixed in the illustrated embodiment—by a spring 17' acting upon the end faces of the two clutch elements 15a, 15b. The clutch element 15a is supported by the housing part 11, if necessary via an intermediate bearing 18, while the clutch element 15b may be supported on the drive shaft 10. The clutch element 15b and the drive shaft 10 are interconnected by a driving-type connection in the form of a delayed-action clutch which comprises a transverse pin 19 fixed to the drive shaft 10 on the side of the screwing tool, outside the clutch element 15b.

Figure 2:
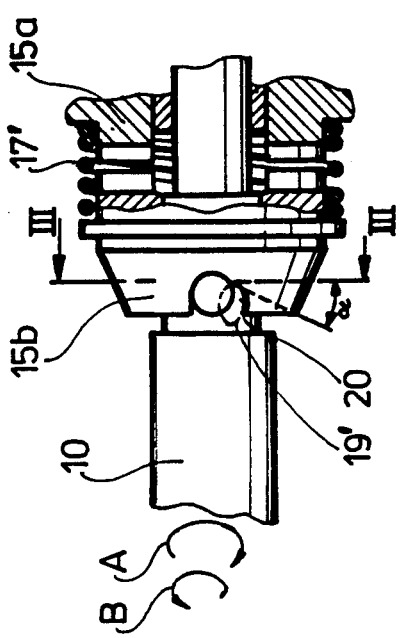

As can be seen best in the top view of FIG. 2, this transverse driving pin 19 engages at least one, preferably two diametrically opposite guide pockets 20, which are axially open relative to the transverse pin and provided on the second clutch element 15b. These guide pockets 20 are worked into the end faces of the second clutch portion 15b, on the side facing away from the jaws 17, and take the form of recesses which are open both radially to the outside and axially in the direction towards the transverse driving pin 19.

Such a delayed-action clutch can be produced without any difficulty since in spite of one particularity, which will be described in more detail further below, the guide pockets 20 can be worked into the surface easily, being open both in the axial direction and in the radially outward direction, so that they can be worked into the end face of the second clutch element 15b without any problems, for example by cutting processes, planing, EDM machining, or the like.

Similarly, the assembly of the individual components is facilitated by this arrangement as it is now only necessary to insert the end of the drive shaft opposite the screwing tool into the respective bearing openings provided in the housing until the transverse driving pin 19 comes to engage the guide pockets 20.

As can be seen best also in FIG. 2, the surface of the bottom of each guide pocket 20 on the one hand, and a transverse axis on the other hand include between them an angle $\alpha$, so that when the transverse pin 19 slides within the guide pocket 20 in the direction of rotation—this is possible due to the larger inner dimensions of the guide pocket 20, relative to the transverse pin—an axial relative movement between the two elements, namely the drive shaft 10 and the second clutch element 15b, will result simultaneously. For, the two elements move away from each other when the drive shaft 10 (see FIG. 2) is displaced in the direction of rotation indicated by arrow A relative to the second clutch element 15b, while—as can be verified very easily—the two elements approach each other when the relative rotation occurs in the direction indicated by arrow B. In this latter case, the transverse pin 19 is permitted to drop more deeply into the respective guide pocket 20.

The advantageous and basic functions resulting therefrom can be derived very clearly from the two publications mentioned before, DE-PS 36 37 852 and DE-PS 3510 605, so that they need not be described here in full detail.

As the drive shaft 10 is seated in the tool for axial displacement, it will be entrained by the jaw clutch 16 when drive shaft, with a screwing bit fitted therein, is pressed upon a screw to be screwed in. The pressure so exerted acts to overcome the restoring opening force of the spring 17', between the two clutch elements 15a, 15b, whereupon the jaws 17 engage each other and the whole unit is entrained in the direction of rotation B (the screwing-in direction). During this action, the transverse pin 19 may, initially, remain in its lowest position (the entraining action is ensured in this case by frictional force), while as the screwing force and, consequently, the torque increases, the transverse driving pin 19 will gradually assume the position 19'—indicated by dotted lines—in the guide pocket 20 where it will take care of the continuous driving connection, by formlocking engagement, while on the other hand the drive shaft 10 and the second clutch element 15b have simultaneously been moved apart by the action of the inclined surface (angle α).

Figure 3:
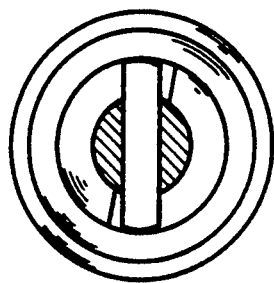
FIG. 3 shows a cross-section through FIG. 2 along line III—III.

If the driving torque continues to be maintained and becomes very high so that the depth stop of the housing comes to bear against an outer stop surface, then the axially displaceable drive shaft 10, with the second clutch half 15b mounted thereon, will necessarily move to the left —as viewed in the drawing—so that the jaws 17 of the jaw clutch 16 will gradually get disengaged from each other until the moment when the jaws are separated and the transmitted torque drops to 0, if only instantaneously, when the ceiling torque has been reached. At this moment, the torque which previously urged the transverse driving pin 19 against the outer forward stop surface of the guide pocket 20, has disappeared; the driving pin 19 is restored, by the action of the spring 17, to the position illustrated in FIG. 2, which corresponds to a relative approximation between the drive shaft 10 and the second clutch element 15b. As the drive shaft 10 is prevented from moving in the axial direction—it is still positioned at this moment on the screw to be screwed in—the jaws 17 of the jaw clutch will immediately be lifted off each other by the clearance obtained when the driving pin 19 has run up or down the full inclined surface of the respective guide pocket 20. The relative angle of rotation run through during such movement is illustrated in FIG. 3.

The above arrangement provides a particularly simple, lowcost delayed-action clutch in the area of the drive unit/jaw clutch of a power-driven screwing tool free from wear and which, above all, can be produced and assembled without any problem.

I claim:

1. A power-driven screwing tool comprising:
   a housing;
   a drive motor;
   an adjustable depth stop;
   a torque responsive first clutch positioned in said housing and coupled to said motor;
   a bearing;
   a drive shaft having one end seated in said bearing and the other end adapted to receive a screwing tool, said bearing being mounted on said housing and adapted to receive said first clutch for supporting said first clutch in an axially-fixed relationship to the longitudinal axis of said drive shaft, said drive shaft being displaceable relative to said depth stop and having a transverse pin mounted thereon;
   a second clutch in driving relationship to said first clutch; said second clutch having an open-ended guide pocket, the open end of said guide pocket extending axially outwardly towards the screwing tool, said guide pocket having a first and second section, said first section being positioned at the open end of said guide pocket, and having a predetermined inclination relative to to longitudinal axis of said drive shaft, said second section being positioned rearwardly of said first section; and
   biasing means between said first and second clutches for biasing said clutches apart, whereby said transverse pin is adapted to be positioned in said guide pocket, said pin sliding along said inclination into said first section of said guide pocket in response to the drive torque, thereby moving said second clutch towards said first clutch, said pin moving into said second section of said guide pocket in response to release of the drive torque when said housing reaches said depth stop to actuate said biasing means so that said first and second clutches are propelled apart.

2. A power-driven screwing tool according to claim 1, wherein the biasing of said clutches apart is limited by a stop rotated to said housing.

3. A power-driven screwing tool according to claim 1, wherein the biasing of said clutches apart is limited by a stop mounted to said drive shaft.

4. A power-driven screwing tool according to claim 1, wherein the outer circumference of said bearing supports said first clutch in said axially fixed relationship.

5. A power-driven screwing tool according to claim 4, wherein the outer circumference of said bearing comprises a needle bearing for receiving said first clutch.

* * * * *